United States Patent
Bakk et al.

(10) Patent No.: US 12,207,374 B2
(45) Date of Patent: Jan. 21, 2025

(54) METHOD FOR GROUPING LUMINAIRES

(71) Applicant: Tridonic GmbH & Co KG, Dornbirn (AT)

(72) Inventors: Istvan Bakk, Torokbalint (HU); Christian Fragner, Loipersdorf (AT); Anna Werkovits, Graz (AT)

(73) Assignee: Tridonic GmbH & Co KG, Dornbirn (AT)

( * ) Notice: Subject to any disclaimer, the term of this patent is extended or adjusted under 35 U.S.C. 154(b) by 141 days.

(21) Appl. No.: 17/909,871

(22) PCT Filed: Feb. 23, 2021

(86) PCT No.: PCT/EP2021/054470
§ 371 (c)(1),
(2) Date: Sep. 7, 2022

(87) PCT Pub. No.: WO2021/180466
PCT Pub. Date: Sep. 16, 2021

(65) Prior Publication Data
US 2023/0093874 A1    Mar. 30, 2023

(30) Foreign Application Priority Data
Mar. 11, 2020 (EP) .................................... 20162442

(51) Int. Cl.
*H05B 47/19* (2020.01)
*H05B 47/11* (2020.01)
(52) U.S. Cl.
CPC ............. *H05B 47/19* (2020.01); *H05B 47/11* (2020.01)

(58) Field of Classification Search
CPC ...... H05B 47/11; H05B 47/115; H05B 47/19; Y02B 20/40
See application file for complete search history.

(56) References Cited

U.S. PATENT DOCUMENTS 11,941,563 B1 *    3/2024   Cook ..................... G06Q 50/02
12,013,088 B2 *    6/2024   Macias .................. H05K 13/00
(Continued)

FOREIGN PATENT DOCUMENTS

WO       2015198181 A1    12/2015

OTHER PUBLICATIONS

Xinran Li and Chenhui Xiang, "Correlation-based K-nearest neighbor algorithm," 2012 IEEE International Conference on Computer Science and Automation Engineering, Beijing, 2012, pp. 185-187 (Year: 2012).*

(Continued)

*Primary Examiner* — Raymond R Chai
(74) *Attorney, Agent, or Firm* — Andrus Intellectual Property Law, LLP

(57) ABSTRACT

A method (20) for grouping luminaires (101a-d) arranged as a grid (100) to generate settings for illuminating scenes in a building. Each of the luminaires (101a-d) has one or more sensors (103, 105, 107). Output signals of said one or more sensors (103, 105, 107) are supplied to the controller (109) for the respective luminaire. The sensor information signals (130) including timestamps and luminaire IDs are forwarded wirelessly to a gateway and then to a central database. The sensor information signals (130) is correlated over a defined period of time, and grouping information is based on the correlations found. The grouping information relates to a spatial arrangement of the luminaires (101a-d).

18 Claims, 5 Drawing Sheets

(56) References Cited

U.S. PATENT DOCUMENTS

| | | | |
|---|---|---|---|
| 2015/0015145 A1* | 1/2015 | Carrigan | H05B 45/20 |
| | | | 315/153 |
| 2017/0135174 A1* | 5/2017 | Aliakseyeu | H05B 47/199 |
| 2018/0242430 A1* | 8/2018 | Gopal Samy | H05B 47/11 |
| 2019/0045300 A1* | 2/2019 | Cho | F21K 9/20 |
| 2020/0021454 A1* | 1/2020 | Pandharipande | H04W 24/08 |

OTHER PUBLICATIONS

EP 20162442.6, European Search Report dated Jul. 13, 2020, 8 pages.
PCT/EP2021/054470, International Search Report and Written Opinion dated Apr. 22, 2021, 7 pages.
Xinran Li et al., "Correlation-based K-nearest neighbor algorithm", 2013 IEEE 4th International Conference on Software Engineering and Service Science, Jun. 1, 2012, pp. 185-187.

* cited by examiner

METHOD FOR GROUPING LUMINAIRES

CROSS REFERENCE TO RELATED APPLICATIONS

The present application is the U.S. national stage application of international application PCT/EP2021/054470 filed Feb. 23, 2021, which international application was published on Sep. 16, 2021 as International Publication WO 2021/180466 A1. The international application claims priority to European Patent Application No. 20162442.6 filed Mar. 11, 2020.

TECHNICAL FIELD OF THE INVENTION

The invention relates to a method for grouping luminaires, in particular luminaires that are arranged as a grid of a plurality of luminaires, and a system comprising said luminaires.

BACKGROUND OF THE INVENTION

Many environments, such as buildings, comprise a large grid of luminaires which are distributed in the environment to ensure that every place in the environment can be illuminated adequately, e.g. every room in the building.

It is known to additionally arrange various types of sensors, e.g. motion sensors or noise sensors, in such an environment to collect environmental information, e.g. information about the presence or distribution of people in the environment. This information can be used to control the luminaire grid.

However, it is difficult and costly to distribute, network and power a sufficient number of different environmental sensors in parallel to the luminaire grid.

In addition, it is difficult to group the plurality of luminaires in a useful way, e.g. to select and activate only a subset of the luminaires to generate a certain illumination scene. Preset groupings must often be changed manually every time the environment changes.

Thus, it is an objective of the invention to provide method for grouping luminaires and a system comprising a grid of a plurality of said luminaires, which avoid the above-mentioned disadvantages.

SUMMARY OF THE INVENTION

The object of the present invention is achieved by the solution provided herein.

According to a first aspect, the invention relates to a method for grouping luminaires, the luminaires being arranged as a grid of a plurality of luminaires, each of the luminaires comprising one or more sensors, the method comprising the steps of:
supplying output signals of said one or more sensors to a controller,
preferably wirelessly forwarding sensor information signals including timestamps and luminaire identifiers (IDs) to a central database,
correlating the sensor information signals over a defined period of time, and
generating grouping information based on the correlations found, wherein the grouping information relates to a spatial arrangement of the luminaires.

This achieves the advantage that the luminaires can be grouped efficiently based on environmental information collected with sensors of the luminaires. In particular, the grouping can adapt to changes in the environment and no manual grouping and/or commissioning needs to be done.

The grid of luminaires can be arranged in a building. For example, the grid can be arranged in an office space, a school, or a retail environment.

The sensor information signals can further comprise sensor values that can be based on the output signals of the respective sensors.

Preferably, each output signal, in particular each sensor value, can be associated with a timestamp of the corresponding measurement and the luminaire ID of the luminaire equipped with the respective sensor that conducted the measurement.

In an embodiment, each of the luminaires comprises a light sensor, preferably a daylight sensor, an acoustic sensor, and/or a motion sensor.

Integrating various sensors in each luminaire of the grid, allows collecting a large number of sensor data from various places in the environment. By evaluating this data, a lot of information about the environment can be gained, e.g. about the distribution and movement of people in the environment. This information can be used for grouping the luminaires.

In an embodiment, the controller is arranged for forwarding the sensor information signals repetitively with a constant or a varying, especially adaptive, frequency.

This achieves the advantage that changes in the environment over time can be observed and considered when grouping the luminaires.

In an embodiment, said sensor information signals comprise a sensor value, wherein the sensor value represents a parameter value, preferably an amplitude, of the output signal at the time of the associated timestamp.

This achieves the advantage that sensor values that are sufficient to detect changes in the environment can be forwarded to the database. In particular, only isolated sensor values, e.g. a noise level every few seconds, are forwarded, but no sound recordings or other direct measurements that would allow fingerprinting.

In particular, each sensor information signal comprises at least one sensor value based on an output signal of a sensor.

The output signal can comprise a brightness measurement, an acceleration or motion measurement or a volume measurement.

The time resolution of the forwarded sensor values can depend on the sensor, e.g. 1 to 10 seconds for the motion sensor and 1 to 10 minutes for the light sensor.

In an embodiment, said sensor information signals are forwarded using a low-energy, short-range wireless protocol, namely, the BLUETOOTH® standard.

In an embodiment, the step of correlating encompasses a supervised learning, preferably to find neighboring luminaires of the grid.

This achieves the advantage that the sensor information can be correlated efficiently.

In an embodiment, the step of correlating comprises a k-nearest neighbor computation, preferably to find neighboring luminaires of the grid.

This achieves the advantage that the sensor information can be correlated efficiently.

In an embodiment, the step of correlating comprises an unsupervised learning procedure.

This achieves the advantage that the sensor information can be correlated efficiently.

In an embodiment, the step of correlating comprises applying a correlation algorithm, such as the Pearson Product-Moment Correlation coefficient, preferably in matrix form to a time series of sensor information signals, in particular to a time series of at least one of the output signals.

This achieves the advantage that the sensor information can be correlated efficiently.

In an embodiment, the step of correlating is followed by a hierarchical clustering method to generate clusters of correlated data.

This achieves the advantage that the sensor information can be correlated efficiently.

In particular, the step of generating grouping information based on correlations found may comprise the hierarchical clustering method.

In an embodiment, the method comprises the step of: outputting the grouping, in particular a result of the hierarchical clustering, at a user interface to provide the grouping information.

This achieves the advantage that the result of the grouping can be provided to a user for information and further analysis.

In an embodiment, the method comprises the further step of: generating settings, in particular settings of the luminaires of the grid, based on the correlations found.

For instance, the settings refer to a dimming value of one or more luminaires or to a sensitivity of an acoustic sensor of a luminaire.

According to a second aspect, the invention relates to a system comprising a grid of a plurality of luminaires, wherein each of the luminaires comprises one or more sensors; wherein the system further comprises a controller supplied with output signals of said one or more sensors, an interface, preferably a wireless interface, a data processing unit and a central database; wherein the interface is configured to forward the sensor information signals including timestamps and luminaire IDs to a central database; wherein the data processing unit is configured to correlate the sensor information signals in the central database over a defined period of time; and wherein the data processing unit is configured to generate grouping information based on the correlations found, wherein the grouping information relates to a spatial arrangement of the luminaires.

This achieves the advantage that the luminaires can be grouped efficiently based on environmental information collected with sensors of the luminaires. In particular, the grouping can adapt to changes in the environment and no manual grouping and/or commissioning needs to be done.

The above description with regard to the method for grouping luminaires according to the first aspect of the invention is correspondingly valid for the system according to the second aspect of the invention.

BRIEF DESCRIPTION OF THE DRAWINGS

The invention will be explained in the followings together with the figures.

DETAILED DESCRIPTION OF THE PREFERRED EMBODIMENTS

Figure 1A:
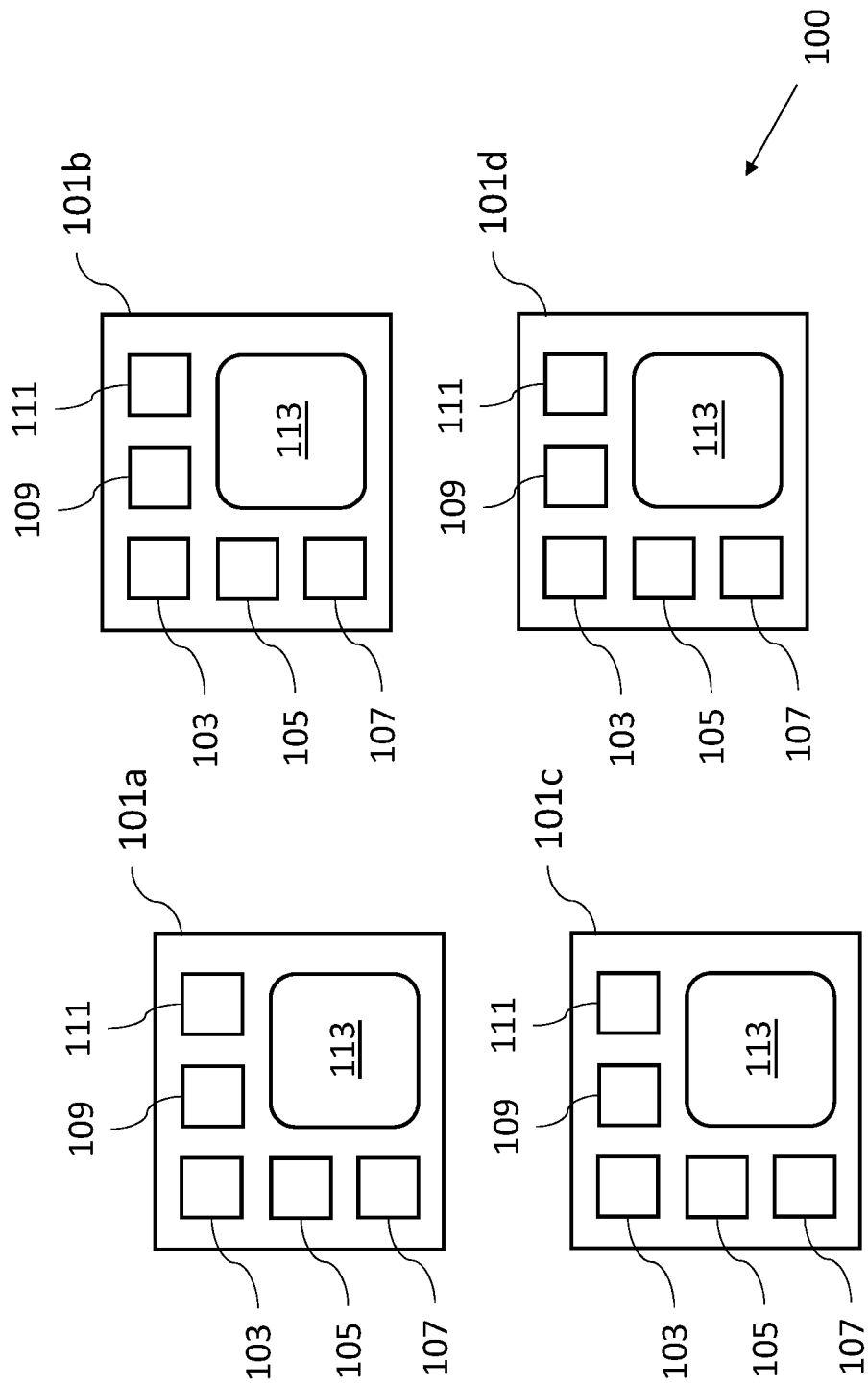
FIG. 1a shows a schematic diagram of a grid of a plurality of luminaires according to an embodiment.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

FIG. 1a shows a schematic diagram of a grid 100 of a plurality of luminaires 101a-d according to an embodiment.

Each of the luminaires 101a-d in the grid 100 comprises a light sensor 103, preferably a daylight sensor, an acoustic sensor 105, a motion sensor 107, a controller 109 supplied with the output signals of said sensors 103, 105, 107, and a wireless interface 111 for a communication between the controller 109 and a gateway for forwarding sensor information signals to a central database (not shown in FIG. 1a).

The grid 100 can be arranged in an environment, in particular a building. Since luminaires 101a-d are typically evenly distributed over such an environment, equipping each luminaire 101a-d with sensors 103, 105, 107 leads to a good coverage of the environment with the sensors. Equipping luminaires with sensors has the additional advantage that no extra planning or commissioning for mounting external sensors in the environment has to be done.

In particular, the wireless interface 111 is configured to communicate with the gateway, in particular to forward the sensor information signals to the gateway. The gateway can be a wireless gateway.

Preferably, each luminaire 101a-d in the grid 100 comprises a light source 113, in particular a plurality of LEDs.

Each of the luminaires 101a-d can be a downlight luminaire, a linear luminaire or an area light. In particular, the grid 100 comprises different types of luminaires at different locations in the environment.

The controller 109 can be a micro controller unit (MCU).

Preferably, the controller 109 of each luminaire 101a-d is arranged for forwarding the sensor information signals repetitively with a constant or a varying, especially adaptive, frequency. In particular, the controller is configured to control the wireless interface 111 to forward the sensor information signals.

Preferably, the wireless interface 111 of each luminaire 101a-d comprises a low-energy, short-range wireless protocol BLUETOOTH® interface.

The sensor information signals can comprise a timestamp, an identifier of the respective luminaire 101a-d and a sensor value. Via the timestamp and the identifier, the sensor value can be correlated to a place and time in the environment. In this way, a 2D mapping of the sensor values, e.g. anisotropic analog data, can be generated based on data stored in the central database. For instance, the 2D mapping shows a noise level or a brightness in the environment at different times during the day.

The acoustic sensor 105 of each luminaire 101a-d can be a noise detector. In particular, the acoustic sensor 105 is configured to detect a noise pressure level and/or noise patterns such as voice or burst sounds.

The motion sensor 107 can be a Doppler based motion sensor, i.e. a sensor that detects motion based on the Doppler Effect. In particular, the motion sensor 107 is configured to detect a motion intensity.

The light sensor 103 can be configured to detect a light intensity, e.g. of daylight.

The grid 100 can comprise multiple luminaires 101a-d equipped with the same type and number of sensors. Alternatively, luminaires 101a-d of one grid 100 may comprise different sensors.

Figure 1B:
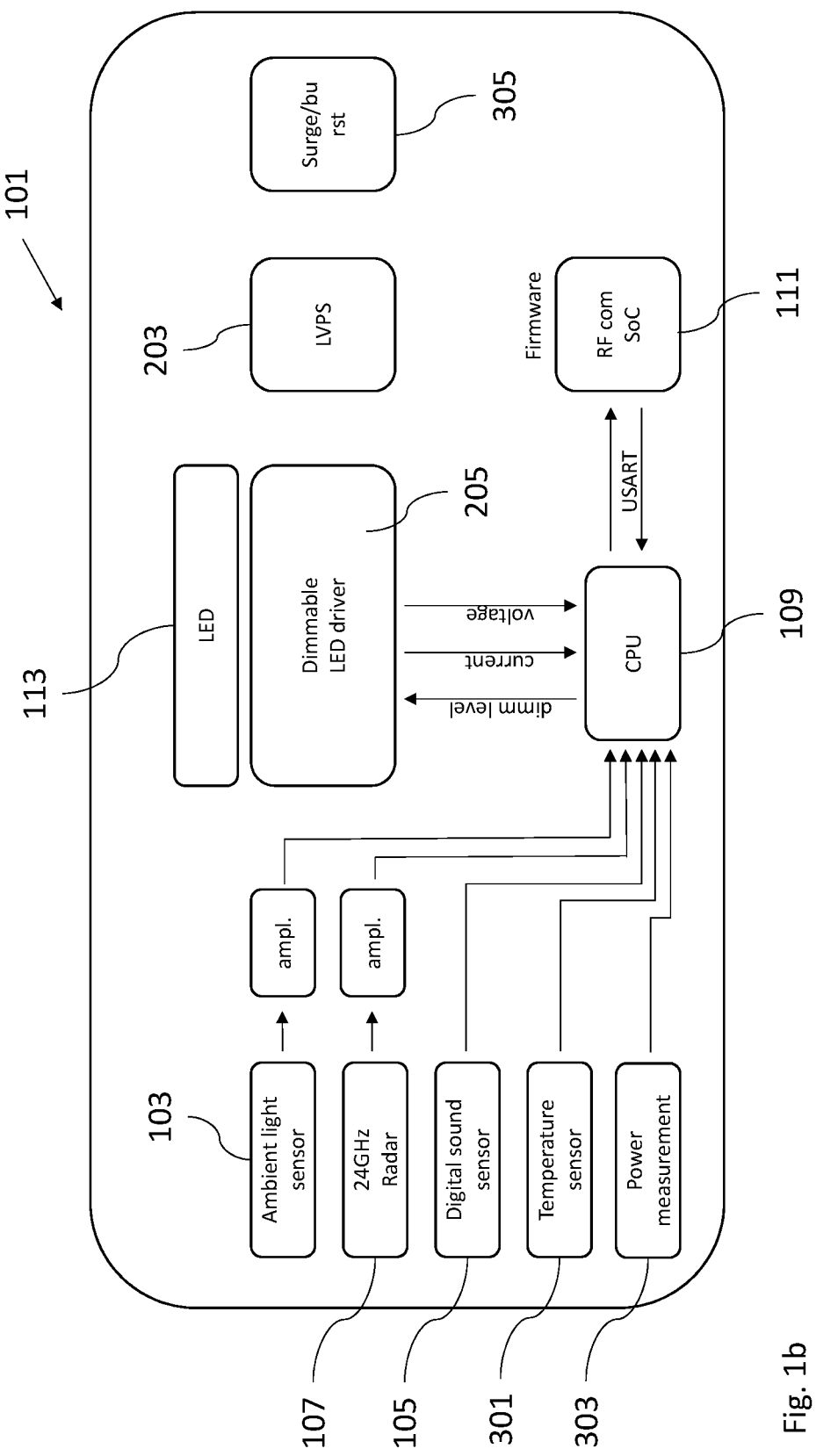
FIG. 1b shows a schematic diagram of a luminaire according to an embodiment.

FIG. 1b shows a schematic diagram of a luminaire 101 according to an embodiment.

In particular, the luminaire 101 shown in FIG. 1b is an exemplary embodiment of a luminaire 101a-b of the grid 100, as for example shown in FIG. 1a.

The luminaire 101 comprises the light sensor 103, the motion sensor 107, e.g. in form of a 24 GHz radar sensor, and the acoustic sensor 105, e.g. in form of a digital sound sensor.

The luminaire 101 can further comprises a temperature sensor 301 and a power measurement unit 303, e.g. for measuring a power consumption by the luminaire 101.

Furthermore, the luminaire 101 can comprises a vibration sensor (not shown), e.g. for detecting vibrations in the ceiling.

Preferably, the sensors 103, 105, 107, 301 and 303 are configured to forward sensor values to the controller 109. In FIG. 1b, the controller comprises a CPU.

The sensor values can comprise amplitudes of detected signals, for instance, a brightness value detected by the light sensor 103 or a velocity of a movement detected by the motion sensor.

The luminaire 101, as shown in FIG. 1b, comprises a dimmable LED driver 205 connected to the light source 113, wherein the light source 113 comprises LEDs. The controller 109 can be configured to control a dim level of the light source 113. The controller 109 can further be configured to receive information on a voltage or current consumption of the LEDs.

The wireless interface 111 can be configured to communicate with the controller 109 via the USART (Universal Synchronous/Asynchronous Receiver Transmitter) protocol. The wireless interface 111 can be integrated in the luminaire 101 as a system on a chip (SoC).

The luminaire can further comprise a surge/burst protection unit 305.

Figure 2:
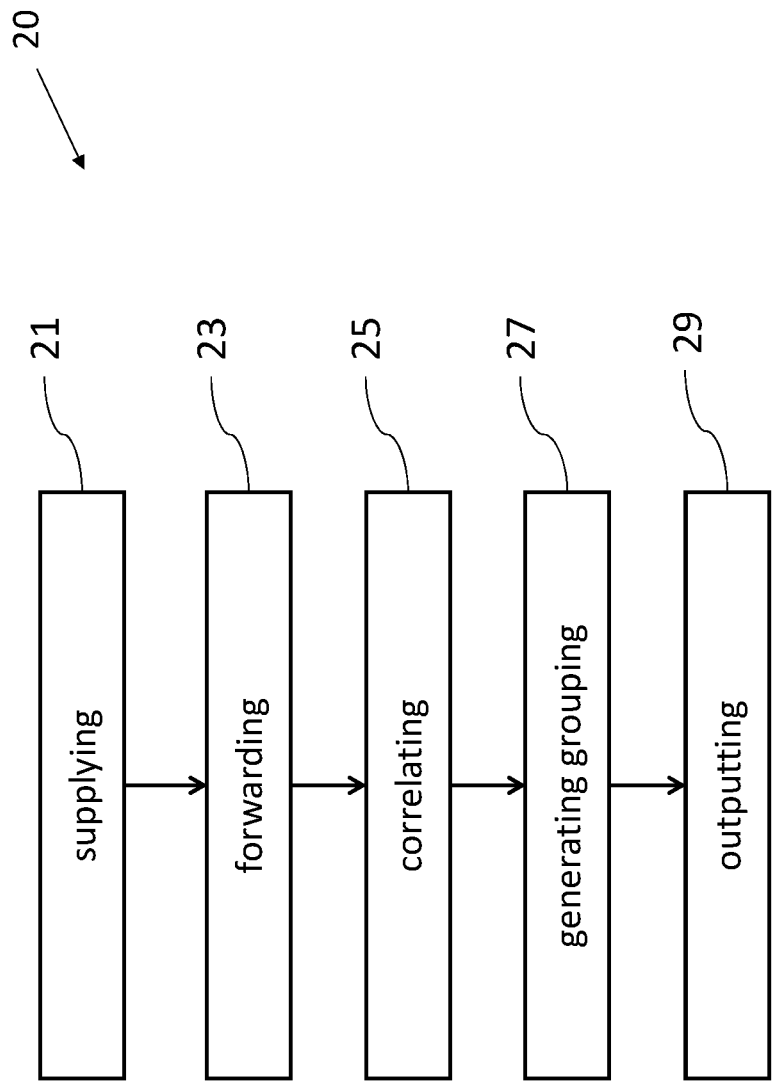
FIG. 2 shows a schematic diagram of a method for grouping luminaires according to an embodiment.

FIG. 2 shows a schematic diagram of a method 20 for grouping the luminaires 101a-d according to an embodiment.

The luminaires 101a-d are arranged as a grid 100 of a plurality of luminaires 101a-d. Each of the luminaires 101a-d comprises one or more sensors, in particular the light sensor 103, the acoustic sensor 105, and/or the motion sensor 107.

The method 20 comprises the steps of:
supplying 21 output signals of said one or more sensors 103, 105, 107 to the controller 109,
forwarding 23, preferably wirelessly forwarding, sensor information signals including timestamps and luminaire IDs to the central database,
correlating 25 the sensor information signals over a defined period of time, and
generating 27 grouping information based on the correlations found, wherein the grouping information relates to a spatial arrangement of the luminaires 101a-d.

The method 20 as shown in FIG. 2 further comprises the step of:
outputting 29 the grouping at a user interface.

Preferably, the method 20 comprises the further step of:
generating settings, in particular settings of the luminaires of the grid, based on the correlations found.

In particular, the central database comprises or is connected to a display. The display can be configured to display the user interface.

The correlation 25 and/or grouping 27 can additionally be generated based on a location of each luminaire 101a-d, e.g. based on the luminaire ID, on the neighboring luminaires 101a-d, and on a recording time of each sensor value.

By taking into account the sensor values, the type of sensed data, a time resolution, and a special resolution, the luminaires 101a-d that belong to the same usage scene can be identified an grouped efficiently. Further, the grouping can adapt to a detected change in the environment.

Preferably, the controller 109 is arranged for forwarding the sensor information signals repetitively with a constant or a varying, especially adaptive, frequency.

Preferably, the sensor value represents a parameter value, preferably the amplitude, of the signal at the time of the associated timestamp. For instance, the acoustic sensor periodically, e.g. every 5 seconds, provides the amplitude of a sound level, which can be used to determine if people are present in a certain room.

The sensor information signals can be forwarded, in particular by the wireless interface 111, using e.g. the BLUETOOTH® standard. In this way, the emitted sensor information signals can be received with a BLUETOOTH® capable mobile device, e.g. a smartphone, which can act as a gateway device.

The step of correlating 25 the sensor information signals over a defined period of time can comprise comparing the sensor information, in particular data pattern, of different sensors and/or different luminaires 101a-d over time.

The step of generating 27 grouping information can comprise associating luminaires by data pattern similarities.

Preferably, the step of correlating 25 comprises the use of a machine learning techniques. The machine learning techniques can comprise supervised learning and/or a k-nearest neighbor computation, preferably to find neighboring luminaires 101a-d of the grid 100.

Supervised learning can comprise learning a function that maps an input to an output, in particular based on input-output pairs provided as examples.

In particular, the k-nearest neighbor computation is a pattern recognition technique, which comprises generating an output based on an input of k closest training examples, e.g. sensor information signals.

The step of correlating 25 can further comprise an unsupervised learning procedure and/or a hierarchical clustering method to generate correlation data.

In particular, finding next neighbor luminaries 101a-d in a grid 100 is a first approach to group the luminaires 101a-d. This task can be realized by applying a supervised learning k-nearest neighbors algorithm. For this estimation, the irregular time series of radar sensors can be used. For every data point from the luminaire 101a-d of interest (entry in the respective radar time series), the distances to other data points of luminaires 101a-d in the same grid 100 can be calculated and, subsequently, the labels of the k-nearest distances can be stored in a list. This process can be repeated for every luminaire 101a-d of the grid 100. To identify the e.g. three next neighbors of a luminaires 101a-d, the first three most common labels can be taken into account.

Another possible solution to reach the goal of finding next neighbor luminaries 101a-d is to use correlations between the regular radar time series (and/or regular lux time series combined in a fusion matrix). To classify the next neighbors of a luminaire 101a-d, the luminaires 101a-d with the closest correlation coefficient can be taken into account.

Preferably, to determine which luminaries 101a-d are located in the same area/room mainly the two methods, correlation calculation between radar and light sensor time series and following implementation of the unsupervised learning algorithm hierarchical clustering can be applied. In particular, correlation describes the statistical relationship between different variables; more precisely, it indicates the strength and direction of the linear relationship between variables. To separate the luminaires 101a-d into different areas/rooms the correlation matrices of the fusion sensor data can be used as input data to feed a hierarchical clustering algorithm. Because this clustering algorithm can be an unsupervised learning method, no labelled data is necessary.

In particular, this algorithm can group similar objects into groups by generating a hierarchy of clusters. Another possibility is to use the k-means algorithm to cluster luminaires into groups.

Figure 3:
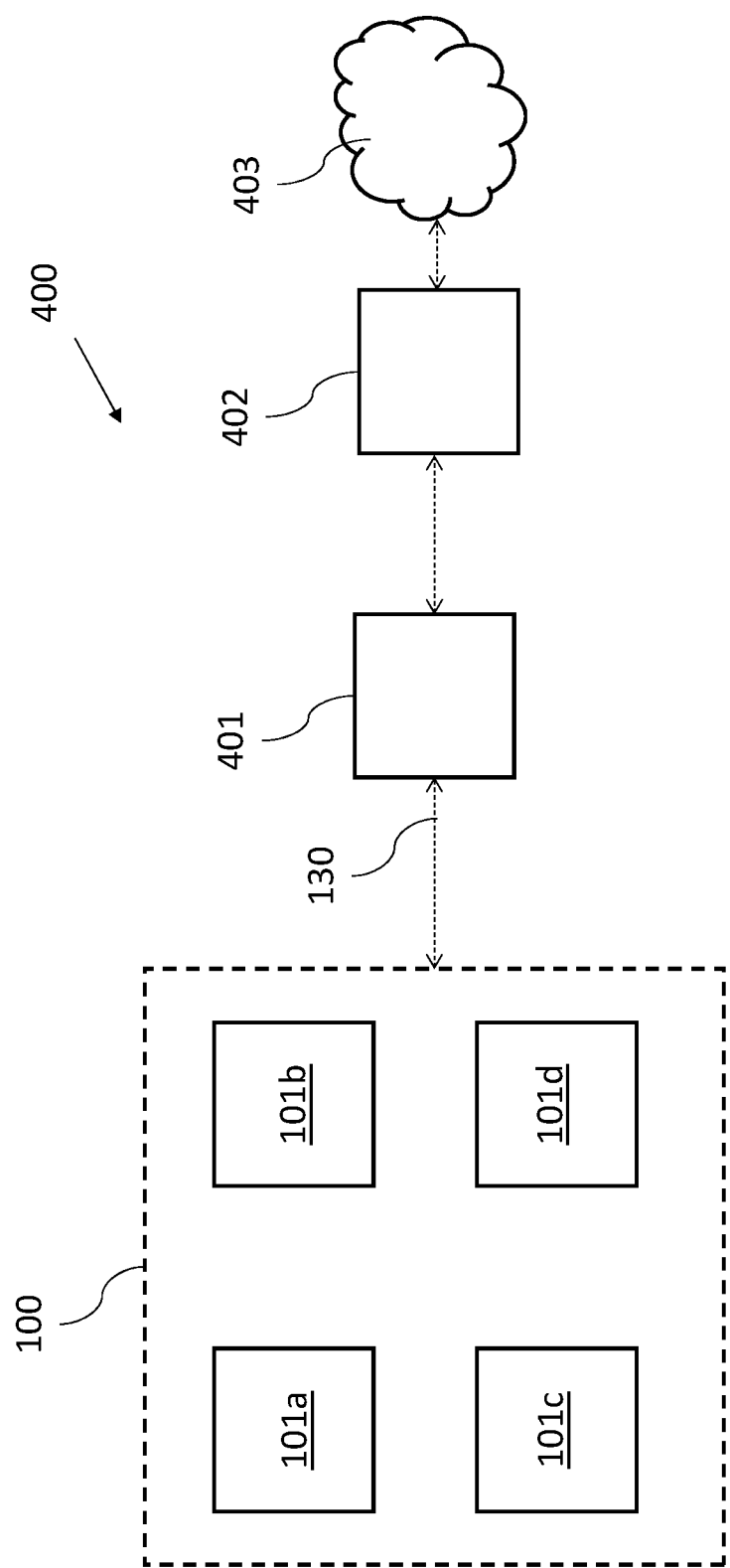
FIG. 3 shows a schematic diagram of a system comprising a grid of a plurality of luminaires according to an embodiment.

FIG. 3 shows a schematic diagram of a system 400 comprising a grid 100 of a plurality of luminaires 101a-d according to an embodiment. In particular, the grid 100 of the system 400 shown in FIG. 3 corresponds to the grid 100 as shown in FIG. 1a.

Each of the luminaires 101a-d of the grid 100 comprises one or more sensors 103, 105, 107. For instance, each luminaire comprises a light sensor 103, preferably a daylight sensor, an acoustic sensor 105, and/or a motion sensor 107.

The system 400 further comprises a controller 109 supplied with output signals of said one or more sensors 103, 105, 107, an interface, preferably a wireless interface 111, a data processing unit 402 and/or a central database 403.

The interface 111 can be configured to forward sensor information signals 130 including timestamps and luminaire IDs to the central database 403, wherein the data processing unit 402 is configured to correlate the sensor information signals 130, in particular the sensor information signals 130 stored in the central database 403, over a defined period of time. The data processing unit 402 can be configured to generate grouping information based on the correlations found, wherein the grouping information relates to a spatial arrangement of the luminaires 101a-d.

The system can further comprise a gateway 401. The interface of each luminaire 101a-d can be configured to forward sensor information signals 130 from the sensors 103, 105, 107 of the respective luminaires 101a-d to the gateway 401. The gateway 401 can be configured to forward the received sensor information signals to the central database 403. Preferably, the gateway 401 is a wireless gateway.

The data processing unit 402 can be a computer.

The central database 403 can be a memory of the data-processing unit or of another device. Alternatively, the central database 403 can be a cloud storage.

Figure 4:
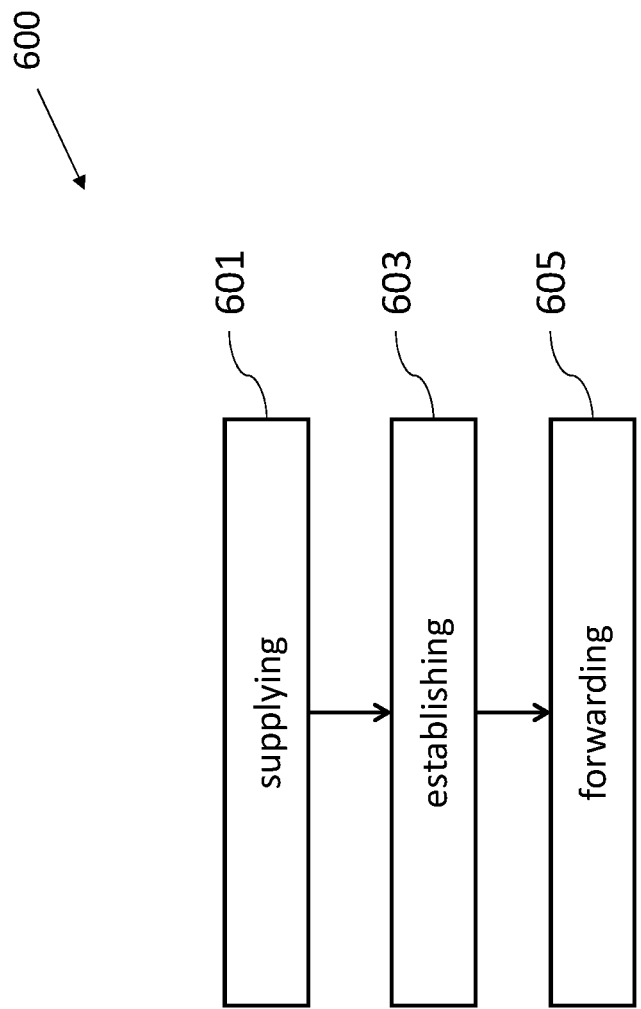
FIG. 4 shows a schematic diagram of a method for operating a grid of a plurality of luminaires.

FIG. 4 shows a schematic diagram of a method 600 for operating a grid 100 of a plurality of luminaires 101a-d.

In particular, the grid 100 of the plurality of luminaires 101a-d correspond to the grid 100 as depicted in FIG. 1a. Each luminaire 101a-d can comprise at least one sensor. For instance, each luminaire comprises a light sensor 103, preferably a daylight sensor, an acoustic sensor 105, and/or a motion sensor 107.

The method 600 comprises the steps of:
supplying 601 output signals of luminaires 103, 105, 107 to the controller 109,
establishing 603 a communication connection between the controller 109 and the gateway 401, and
forwarding 605 sensor information signals 130 to the data processing unit 402 and/or the central database 403 by means of the gateway 401.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only one of the several implementations, such features may be combined with one or more other features of the other implementations as may be desired and advantage for any given or particular application.

The invention claimed is:

1. A method (20) for grouping luminaires (101a-d), the luminaires (101a-d) being arranged as a grid (100) of a plurality of luminaires (101a-d), the method (20) comprising the steps of:
providing one or more sensors (103, 105, 107) on each luminaire (101a-d), wherein one of the sensors is a Doppler radar motion sensor;
supplying (21) output signals of said one or more sensors (103, 105, 107) to a controller (109) for the respective luminaire (101a-d);
wirelessly forwarding (23) sensor information signals (130) from the controllers to a central database (403), the forwarded sensor information signals including timestamps indicating the time that the respective output signal from the one or more sensors is received by the controller (109) for the respective luminaire (101a-d) and luminaire IDs for the luminaire forwarding the respective sensor information signals wherein sensor information signals (130) including timestamps and luminaire IDs are forwarded wirelessly from the controller to a gateway and then to the central database (403), and wherein the time resolution of sensor information signals for the respective Doppler radar motion sensor is 1 to 10 seconds;

correlating (25) the sensor information signals (130) over a defined period of time, wherein radar data is correlated as a radar data time series, and generating (27) grouping information based on the correlations found, wherein the grouping information relates to a spatial arrangement of the luminaires (101a-d), and is used to generate settings for illuminating scenes in the building.

2. The method (20) of claim 1, wherein each of the luminaires (101a-d) further comprises a light sensor (103) light data and radar data are correlated using data time series.

3. The method of claim 2 wherein the light sensor is a daylight sensor.

4. The method (20) of claim 1, wherein the controller (109) is arranged for forwarding the sensor information signals (130) repetitively with a constant or a varying frequency.

5. The method (20) of claim 1, wherein said sensor information signals (130) comprise a sensor value, wherein the sensor value represents a parameter value, of the output signal at the time of the associated timestamp.

6. The method of claim 5 wherein said parameter value of the output signal at the time of the associated timestamp is an amplitude.

7. The method (20) of claim 1, wherein said sensor information signals (130) are forwarded using a low-energy, short-range wireless protocol.

8. The method (20) of claim 1, wherein the step of correlating (25) encompasses a supervised learning to find neighboring luminaires (101a-d) of the grid (100).

9. The method (20) of claim 1, wherein the step of correlating (25) comprises a k-nearest neighbor computation to find neighboring luminaires (101a-d) of the grid (100).

10. The method (20) of claim 1, wherein the step of correlating (25) comprises applying a correlation algorithm in matrix form to a time series of sensor information signals, in particular to a time series of at least one of the output signals.

11. The method of claim 10 wherein said correlation algorithm implements a Pearson Product-Moment Correlation coefficient.

12. The method (20) of claim 1, wherein the step of correlating (25) is followed by a hierarchical clustering method to generate clusters of correlated data.

13. The method (20) of claim 1, comprising the step of:
outputting (29) the grouping at a user interface to provide the grouping information.

14. The method (20) of claim 1, comprising the further step of:
generating settings, in particular settings of the luminaires (101a-d) of the grid (100), based on the correlations found.

15. The method of claim 1 wherein the doppler radar sensor is a 24 GHz doppler radar sensor.

16. A system (400) comprising a grid (100) of a plurality of luminaires (101a-d) in a building, wherein each of the luminaires (101a-d) comprises one or more sensors (103, 105, 107) and one of the sensors is a Doppler radar motion sensor;
wherein the system further comprises:
a controller (109) supplied with output signals of said one or more sensors (103, 105, 107),
a wireless interface (111),
a data processing unit (402) and a central database (403);
wherein the interface (111) is configured to forward sensor information signals (130) including timestamps and luminaire IDs to a gateway and then to the data processing unit and the central database (403), wherein the time resolution of sensor information signals for the respective Doppler radar motion sensor is 1 to 10 seconds;
wherein the data processing unit (402) is configured to correlate the sensor information signals (130) in the central database (403) over a defined period of time and radar data is correlated as a radar data time series; and
wherein the data processing unit (402) is configured to generate grouping information based on the correlations found, wherein the grouping information relates to a spatial arrangement of the luminaires (101a-d) and is used to generate settings for illuminating scenes in the building.

17. The system of claim 16 wherein the doppler radar sensor is a 24 GHz doppler radar sensor.

18. The system of claim 16, wherein each of the luminaires (101a-d) further comprises a light sensor (103) and light data and the radar data are correlated using data time series.

* * * * *